(12) United States Patent
Yoon et al.

(10) Patent No.: US 9,066,078 B2
(45) Date of Patent: Jun. 23, 2015

(54) DISPLAY CONTROLLER AND RELATED METHOD OF OPERATION

(75) Inventors: Sung Chul Yoon, Hwaseong-Si (KR); Jong Ho Roh, Yongin-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 321 days.

(21) Appl. No.: 13/617,339

(22) Filed: Sep. 14, 2012

(65) Prior Publication Data

US 2013/0093761 A1 Apr. 18, 2013

(30) Foreign Application Priority Data

Oct. 13, 2011 (KR) .................. 10-2011-0104349

(51) Int. Cl.
*H04N 13/00* (2006.01)

(52) U.S. Cl.
CPC ...... *H04N 13/0029* (2013.01); *H04N 2213/007* (2013.01)

(58) Field of Classification Search
None
See application file for complete search history.

(56) References Cited

U.S. PATENT DOCUMENTS

| 6,636,647 B1 * | 10/2003 | Ohki et al. ............ 382/284 |
| 2002/0021832 A1 * | 2/2002 | Dawson ............... 382/154 |
| 2011/0122126 A1 | 5/2011 | Han et al. |

FOREIGN PATENT DOCUMENTS

| JP | 2003319417 | 11/2003 |
| KR | 1020100130723 A | 12/2010 |

* cited by examiner

*Primary Examiner* — Said Broome
(74) *Attorney, Agent, or Firm* — Volentine & Whitt, PLLC

(57) ABSTRACT

A display controller includes a merger and an alpha blender. The merger is configured to mix a first left frame including first left pixel data and a first right frame including first right pixel data based on a three-dimensional (3D) display format, and further configured and to output a first mixed frame and a second mixed frame. The alpha blender is configured to blend the first mixed frame and the second mixed frame to produce a first blended frame.

15 Claims, 10 Drawing Sheets

FIG. 3

| $R_B$ | $R_B$ |
|---|---|
| $R_G$ | $R_G$ |
| $R_R$ | $R_R$ |
| $L_B$ | $L_B$ |
| $L_G$ | $L_G$ |
| $L_R$ | $L_R$ |
| $R_B$ | $R_B$ |
| $R_G$ | $R_G$ |
| $R_R$ | $R_R$ |
| $L_B$ | $L_B$ |
| $L_G$ | $L_G$ |
| $L_R$ | $L_R$ |

FIG. 4

| L_R | L_R |
| R_G | R_G |
| L_B | L_B |
| R_R | R_R |
| L_G | L_G |
| R_B | R_B |
| L_R | L_R |
| R_G | R_G |
| L_B | L_B |
| R_R | R_R |
| L_G | L_G |
| R_B | R_B |

FIG. 5

| | Line 1 | Line 2 | Line 3 | Line 4 |
|---|---|---|---|---|
| | $L_R$ | $R_R$ | $L_R$ | $R_R$ |
| | $L_G$ | $R_G$ | $L_G$ | $R_G$ |
| | $L_B$ | $R_B$ | $L_B$ | $R_B$ |
| | $L_R$ | $R_R$ | $L_R$ | $R_R$ |
| | $L_G$ | $R_G$ | $L_G$ | $R_G$ |
| | $L_B$ | $R_B$ | $L_B$ | $R_B$ |
| | $L_R$ | $R_R$ | $L_R$ | $R_R$ |
| | $L_G$ | $R_G$ | $L_G$ | $R_G$ |
| | $L_B$ | $R_B$ | $L_B$ | $R_B$ |
| | $L_R$ | $R_R$ | $L_R$ | $R_R$ |
| | $L_G$ | $R_G$ | $L_G$ | $R_G$ |
| | $L_B$ | $R_B$ | $L_B$ | $R_B$ |

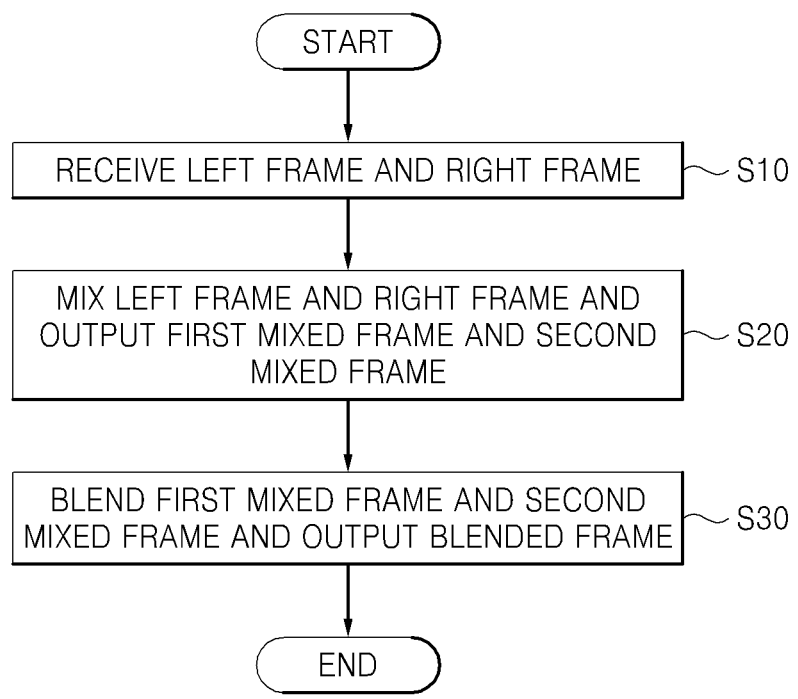

DISPLAY CONTROLLER AND RELATED METHOD OF OPERATION

CROSS-REFERENCE TO RELATED APPLICATIONS

This application claims priority under 35 U.S.C. §119 to Korean Patent Application No. 10-2011-0104349 filed on Oct. 13, 2011, the disclosure of which is hereby incorporated by reference in its entirety.

BACKGROUND OF THE INVENTION

The inventive concept relates generally to display technologies. More particularly, the inventive concept relates to a display controller for a three-dimensional (3D) display system and related methods of operation.

Many 3D display systems rely on the principle of stereoscopy, which is a technique for creating the illusion of depth in a two-dimensional (2D) image by presenting two offset images separately to a viewer's left and right eyes. The two offset images are combined in the viewer's brain to create a perception of 3D depth.

A 3D display system can use various alternative formats to display the two offset images. The most common formats use interleaved pixel data to represent the two offset images. In general, the format used to display the images can influence the required processing and components required. This in turn can influence factors such as cost and performance of the 3D display system.

SUMMARY OF THE INVENTION

In an embodiment of the inventive concept, a display controller comprises a merger and an alpha blender. The merger is configured to mix a first left frame comprising first left pixel data and a first right frame comprising first right pixel data based on a 3D display format, and is further configured and to output a first mixed frame and a second mixed frame. The alpha blender is configured to blend the first mixed frame and the second mixed frame to produce a first blended frame.

In another embodiment of the inventive concept, a method of operating a display controller comprises receiving a first left frame comprising multiple units of first left pixel data, receiving a first right frame comprising multiple units of first right pixel data, and generating a first mixed frame and a second mixed frame by mixing the first left frame and the first right frame according to a 3D display format.

In another embodiment of the inventive concept, a method of operating a display controller comprises operating a merger to mix a first left frame comprising first left pixel data and a first right frame comprising first right pixel data based on a three-dimensional (3D) display format to produce a first mixed frame and a second mixed frame, and operating an alpha blender to blend the first mixed frame and the second mixed frame to produce a first blended frame.

These and other embodiments of the inventive concept may provide stereoscopic perception of 3D depth to a viewer according to the format of pixel data displayed on a 3D display by using a merger. Among other things, this can potentially eliminate a need for an extra chip.

BRIEF DESCRIPTION OF THE DRAWINGS

The drawings illustrate selected embodiments of the inventive concept. In the drawings, like reference numbers indicate like features.

FIGS. 3 through 5 are diagrams of various formats of pixel data that can be used in the 3D display illustrated in FIG. 1 according to embodiments of the inventive concept.

FIG. 10 is a flowchart of a method for operating the display controller illustrated in FIG. 1 according to an embodiment of the inventive concept.

DETAILED DESCRIPTION

Embodiments of the inventive concept are described below with reference to the accompanying drawings. These embodiments are presented as teaching examples and should not be construed to limit the scope of the inventive concept.

In the description that follows, where a feature is referred to as being "connected" or "coupled" to another feature, it can be directly connected or coupled to the other feature or intervening features may be present. In contrast, where a feature is referred to as being "directly connected" or "directly coupled" to another feature, there are no intervening features present. As used herein, the term "and/or" includes any and all combinations of one or more of the associated listed items and may be abbreviated as "/".

Although the terms first, second, etc., may be used to describe various features, these features should not be limited by these terms. Rather, these terms are used merely to distinguish between different features. For example, a first feature could alternatively be termed a second feature and vice versa without changing the meaning of the relevant description.

The terminology used herein is for the purpose of describing particular embodiments and is not intended to limit the inventive concept. As used herein, the singular forms "a", "an" and "the" are intended to encompass the plural forms as well, unless the context clearly indicates otherwise. The terms "comprises" and/or "comprising," or "includes" and/or "including" indicate the presence of stated features but do not preclude the presence other features.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein.

Figure 1:
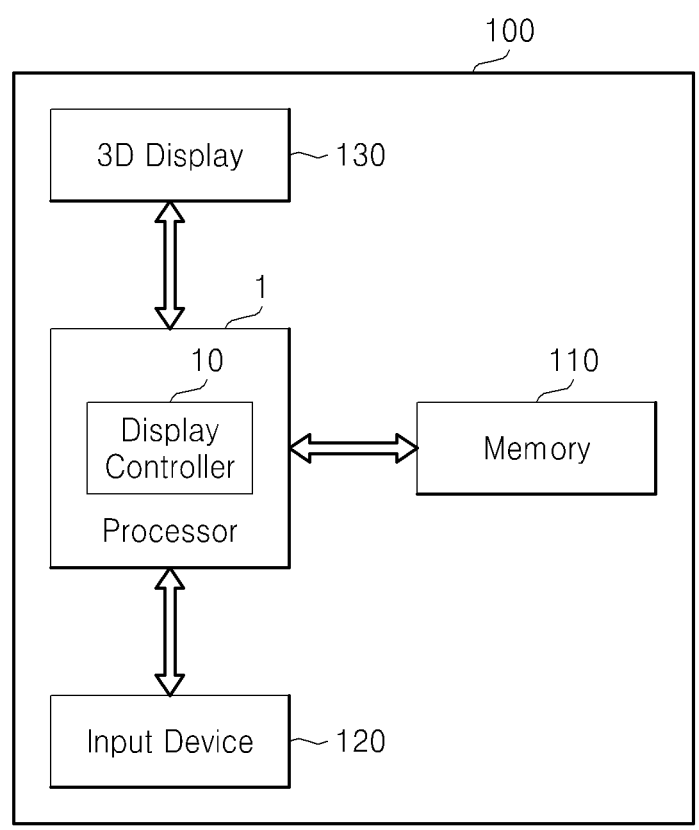
FIG. 1 is a block diagram of a 3D display system comprising a display controller according to an embodiment of the inventive concept.

FIG. 1 is a block diagram of a 3D display system 100 comprising a display controller 10 according to an embodiment of the inventive concept. 3D display system 100 may take various alternative forms and can be used in various types of systems. For instance, it can be implemented as part of a television, a cellular phone, a smart phone, a tablet, a personal computer (PC), a personal digital assistant (PDA), an enterprise digital assistant (EDA), a digital still camera, a digital video camera, a portable multimedia player (PMP), a personal or portable navigation device (PND), a handheld game console, or a hand held device such as an e-reader.

Referring to FIG. 1, 3D display system 100 comprises a processor 1, a memory 110, an input device 120, and a 3D display 130.

Processor 1 controls operation of 3D display system 100. Processor 1 is typically implemented as an application processor, and it can be formed in a single integrated circuit. However, processor 1 is not limited to these characteristics and can take alternative forms as well.

During typical operation, processor 1 reads and executes program instructions, and it reads data from memory 110. Processor 1 may execute program instructions in response to signals input through input device 120 or other portions of 3D display system 100.

A part of memory 110 stores a plurality of frames to be displayed as a 3D image in 3D display 130. In other words, part of memory 110 functions as a frame buffer.

Input device 120 can comprise any type of interface capable of receiving input from a user. For example, it can be implemented as a pointing device such as a touch pad or a computer mouse, a keypad, or a keyboard.

Figure 2:
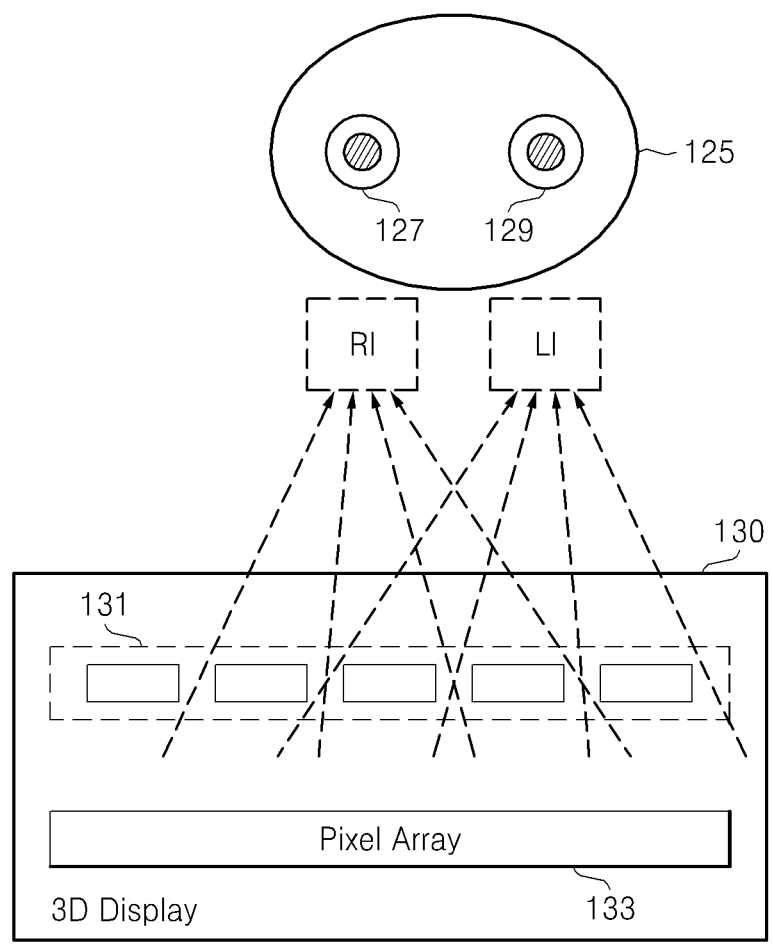
FIG. 2 is a block diagram of a 3D display illustrated in FIG. 1 according to an embodiment of the inventive concept.

FIG. 2 is a block diagram of 3D display 130 according to an embodiment of the inventive concept. 3D display 130 can take various alternative forms, such as a liquid crystal display, a light emitting diode (LED) display, an organic LED (OLED) display, or an active matrix OLED display, to name but a few.

Referring to FIG. 2, 3D display 130 comprises a parallax barrier 131 and a pixel array 133. It generates a left image LI and a right image RI to be presented to a viewer 125 having a right eye 127 and a left eye 129.

Pixel array 133 emits light corresponding to left and right images LI and RI, and parallax barrier 131 filters the emitted light to generate left image LI and right image RI. In other words, parallax barrier 131 creates effects that give viewer 125 the stereoscopic perception of 3D depth. Parallax barrier 131 comprises a plurality of barrier elements that perform the filtering of light emitted from pixel array 133.

3D display 130 may support various 3D display formats to present left image LI and right image RI to viewer 125. These formats may include, for instance, a pixel barrier format, a sub-pixel barrier format, and a line barrier format.

Right image RI and left image LI are separately presented to right eye 127 and left eye 129 of viewer 125 and combined in the brain of viewer 125. Accordingly, viewer 125 receives the stereoscopic perception of 3D depth. To present left image LI and right image RI in a 3D display format (e.g., the pixel barrier format, the sub-pixel barrier format or the line barrier format), the display controller provides a frame in the 3D display format to 3D display 130. The barrier elements may be arranged in various ways according to the 3D display formats.

Pixel array 133 comprises a plurality of pixels, which emit light comprising pixel data. The emitted light is filtered by parallax barrier 131. Parallax barrier 131 operates as an image filter to filter the emitted light. 3D display system 100 using parallax barrier 131 is referred to as an auto-stereoscopic system. 3D glasses (not shown) may be used instead of parallax barrier 131 in other embodiments.

FIGS. 3 through 5 are diagrams of various formats of pixel data that can be used in the 3D display illustrated in FIG. 1 according to embodiments of the inventive concept. In particular, FIG. 3 shows a pixel barrier format, FIG. 4 shows a sub-pixel barrier format, and FIG. 5 shows a line barrier format. In FIGS. 3 through 5, each square represents pixel data. The pixel data may be referred to a color component or a sub pixel.

In FIGS. 3 through 5, "$L_R$", "$L_G$" and "$L_B$" denote respective red, green and blue components that form left image LI and "$R_R$", "$R_G$" and "$R_B$" denote respective red, green and blue components that form right image RI. In alternative embodiments, the red, green and blue components may be replaced with a single luminance (luma) component and two chrominance components, for example.

The color of each pixel in left image LI may be represented using pixel data $L_R$, $L_G$ and $L_B$, and the color of each pixel in right image RI may be represented using pixel data $R_R$, $R_G$ and $R_B$. For instance, a pixel color may be represented by 24-bit color, with each unit of pixel data $L_R$, $L_G$ and $L_B$ being represented by 8 bits. As an example, in left image LI, where a pixel color is red, all bits in the corresponding pixel data $L_R$ are 1 and every bit in the corresponding pixel data $L_G$ and $L_B$ is 0. Alternatively, the pixel color can be represented by 16-bit color. For example, pixel data $L_R$ and pixel data $L_G$ may be represented by 5 bits and pixel data $L_B$ may be represented by 6 bits. In various alternative embodiments, the pixel color can be represented using other numbers of bits.

3D display 130 displays pixel data $L_R$, $L_G$ and $L_B$, $R_R$, $R_G$ and $R_B$ in a format shown in FIG. 3, 4, or 5 using pixel array 133. The pixel data is typically provided to 3D display 130 by display controller 10. Multiple units of left pixel data $L_R$, $L_G$ and $L_B$ form left image LI in parallax barrier 131, and multiple units of right pixel data $R_R$, $R_G$ and $R_B$ form right image RI in parallax barrier 131.

Figure 6:
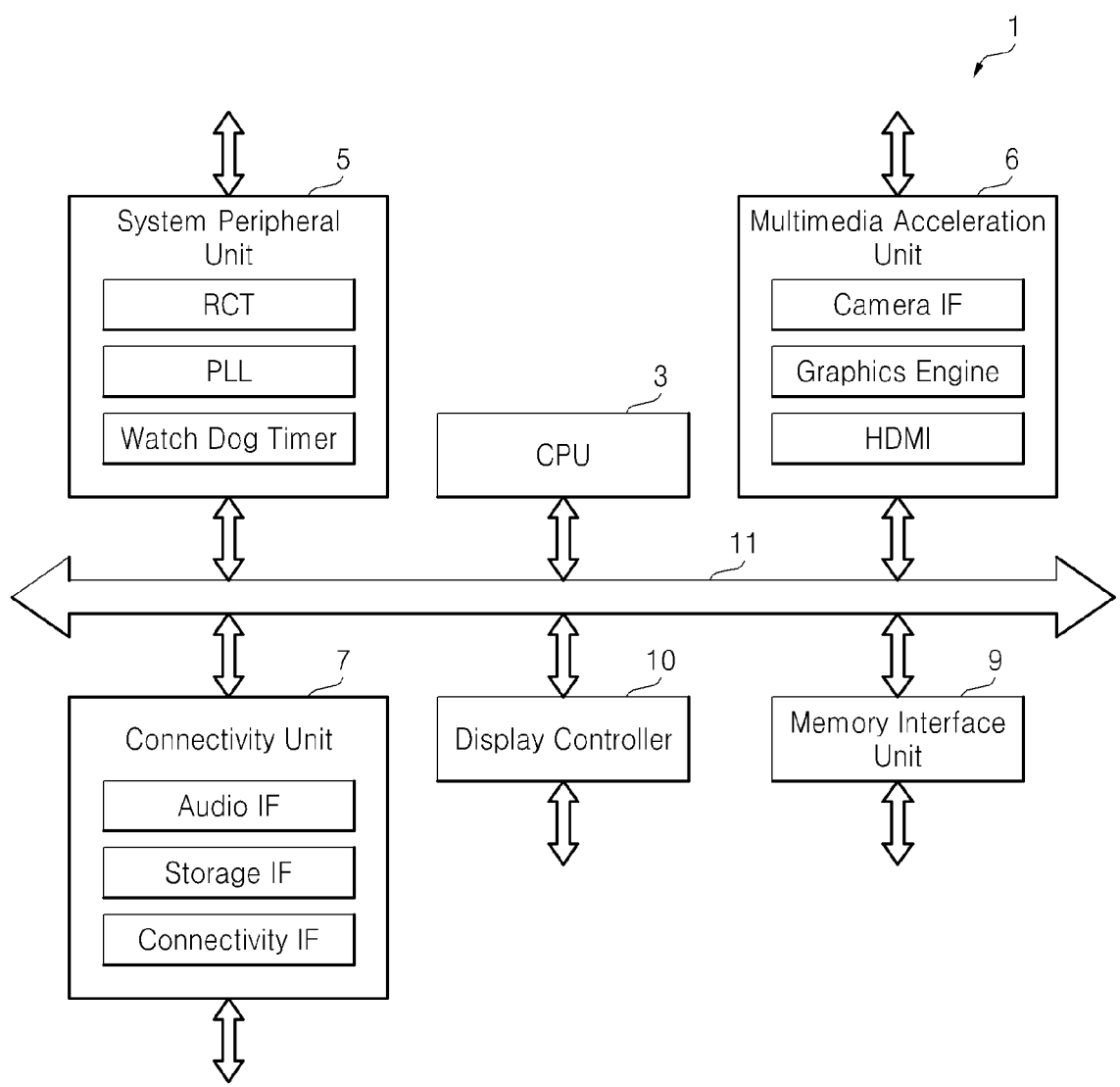
FIG. 6 is a block diagram of a processor illustrated in FIG. 1 according to an embodiment of the inventive concept.

FIG. 6 is a block diagram of processor 1 according to an embodiment of the inventive concept.

Referring to FIG. 6, processor 1 comprises a central processing unit (CPU) 3, a system peripheral unit 5, a media acceleration unit 6, a connectivity unit 7, a memory interface unit 9, and display controller 10. These features communicate with each other through a system bus 11.

CPU 3 reads and executes program instructions and controls the operation of display controller 10. System peripheral unit 5 comprises a real-time clock (RTC), a phase-locked loop (PLL), and a watch dog timer.

The PLL is used to generate a clock for driving processor 1. Memory interface unit 9 receives a plurality of frames from the part of memory 110 that functions as a frame buffer. Display controller 10 provides 3D display 130 a plurality of control signals and frames comprising a plurality of pixels so that right image RI and left image LI are separately presented to right eye 127 and left eye 129 of viewer 125.

Multimedia acceleration unit 6 comprises a graphics engine. In some embodiments, multimedia acceleration unit 6 comprises a camera interface, a graphics engine integrated with a video display circuitry to carry out graphic calculation, or a high-definition multimedia interface (HDMI). In some embodiments, multimedia acceleration unit 6 comprises an interface complying with national television system committee/phase alternate line (HTSC/PAL) standards instead of the HDMI.

Connectivity unit 7 communicates with input device 120 and comprises an audio interface, a storage interface such as an advanced technology attachment (ATA) interface, and a connectivity interface.

Figure 7:
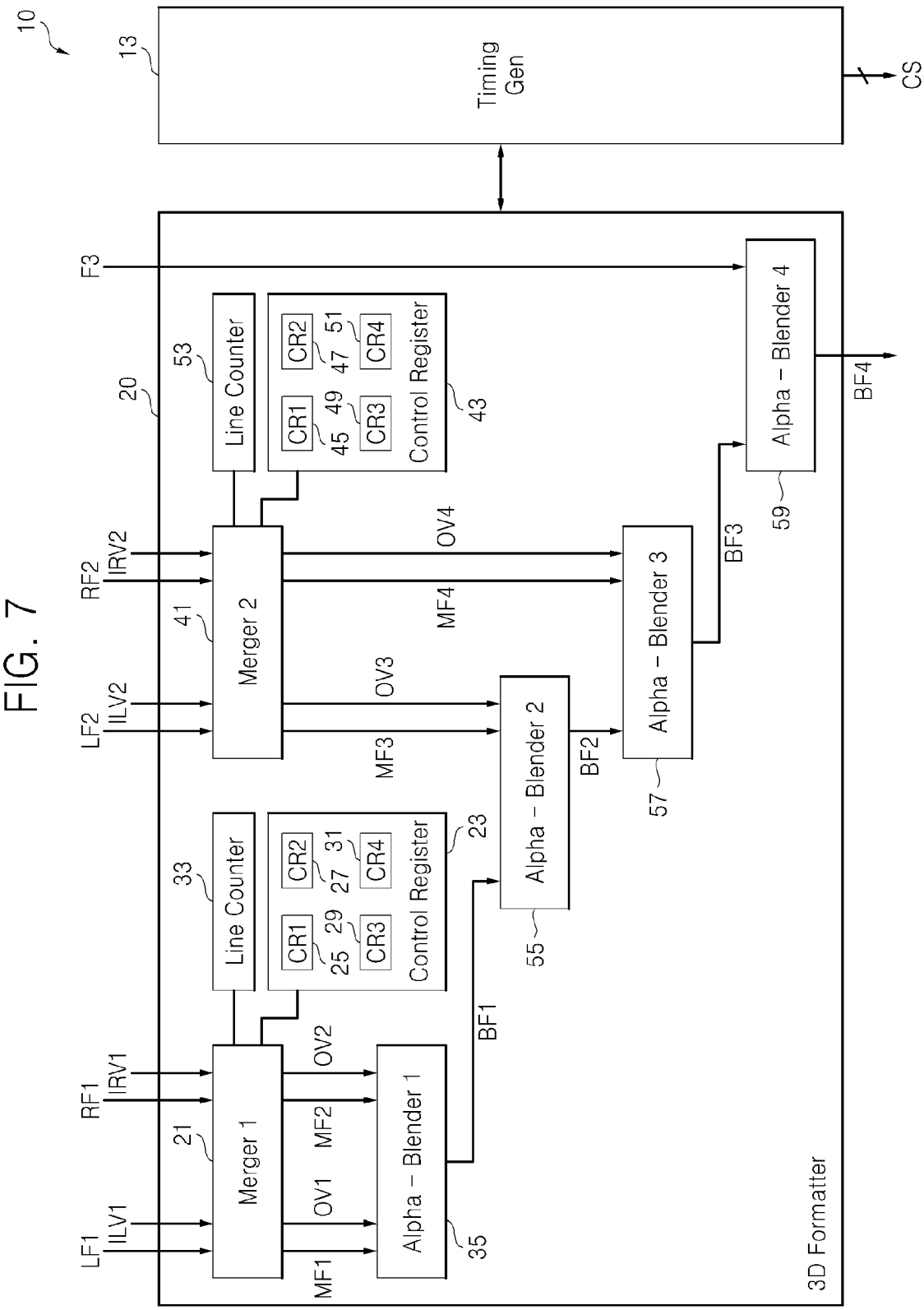
FIG. 7 is a block diagram of a display controller illustrated in FIG. 1 according to an embodiment of the inventive concept.

FIG. 7 is a block diagram of display controller 10 illustrated in FIG. 1 according to an embodiment of the inventive concept.

Referring to FIG. 7, display controller 10 comprises a timing generator 13 and a 3D formatter 20.

Timing generator 13 generates a plurality of control signals CS according to a 3D display format. For instance, control signals CS may comprise a horizontal synchronous signal and a vertical synchronous signal which are used for synchronization of a plurality of pixel data.

3D formatter 20 receives a first left frame LF1 and a first right frame RF1 from memory 110 and outputs a blended frame BF1 according to a 3D display format. First left frame LF1 comprises multiple units of left pixel data $L_R$, $L_G$ and $L_B$ and first right frame RF1 comprises multiple units of right pixel data $R_R$, $R_G$ and $R_B$. First left frame LF1 and first right frame RF1 are mixed with each other according to a predetermined 3D display format, such as the pixel barrier format, the sub-pixel barrier format, or the line barrier format. In the embodiment of FIG. 6, memory interface unit 9 can be used to receive first left frame LF1 and first right frame RF1.

3D formatter 20 comprises a first merger 21, a control register block 23, and a first alpha blender 35. First merger 21 mixes first left frame LF1 with first right frame RF1 according to the 3D display format and outputs a first mixed frame MF1 and a second mixed frame MF2. For instance, where the 3D display format is the pixel barrier format, first mixed frame MF1 may be organized similar to FIG. 3. First mixed frame MF1 may be generated by alternating the order in which units of left pixel data in first left frame LF1 are arranged and the order in which units of right pixel data in first right frame RF1 are arranged. First mixed frame MF1 and second mixed frame MF2 may be complementary to each other. In other words, where first mixed frame MF1 comprises pixel data in order of $L_R$, $L_G$, $L_B$, $R_R$, $R_G$, and $R_B$, second mixed frame MF2 may comprise pixel data in order of $R_R$, $R_G$, $R_B$, $L_R$, $L_G$, and $L_B$.

Where the 3D display format is the sub-pixel barrier format, first mixed frame MF1 may be organized similar to FIG. 4. In this format, first mixed frame MF1 may comprise pixel data in order of $L_R$, $R_G$, $L_B$, $R_R$, $L_G$, and $R_B$, and second mixed frame MF2 may comprise a plurality of pixel data in order of $R_R$, $L_G$, $R_B$, $L_R$, $R_G$, and $L_B$.

Where the 3D display format is the line barrier format, first mixed frame MF1 may be organized similar to FIG. 5. In this format, first mixed frame MF1 may comprise left pixel data $L_R$, $L_G$, $L_B$, $L_R$, $L_G$, $L_B$, $L_R$, $L_G$, and $L_B$ in odd-numbered lines Line1 and Line3 and right pixel data $R_R$, $R_G$, $R_B$, $R_R$, $R_G$, $R_B$, $R_R$, $R_G$, and $R_B$ in even-numbered lines Line2 and Line4.

First merger 21 also receives a first input valid signal ILV1 indicating the input of first left frame LF1 and a second input valid signal IRV1 indicating the input of first right frame RF1 from the part of memory 110. First merger 21 outputs a first output valid signal OV1 indicating the output of first mixed frame MF1 and a second output valid signal OV2 indicating the output of second mixed frame MF2.

Control register block 23 comprises a plurality of control registers 25, 27, 29 and 31. Each of control registers 25, 27, 29 and 31 may be referred to as a special function register (SFR). Control registers 25, 27, 29 and 31 are used to control the operation of first merger 21. For instance, where a bit value of the first control register 25 is set to "1", first merger 21 performs a mixing operation in which first left frame LF1 is mixed with first right frame RF1 according to the 3D display format and first and second mixed frames MF1 and MF2 are output.

Second control register 27 is used to determine which of left pixel data (e.g., $L_R$) and right pixel data (e.g., $R_R$) will come first in first mixed frame MF1. For instance, where a bit value of the second control register 27 is set to "1", the left pixel data (e.g., $L_R$) comes first in first mixed frame MF1.

Where the bit value of the second control register 27 is set to "0", the right pixel data (e.g., $R_R$) comes first in first mixed frame MF1.

First merger 21 may also perform interpolation. The interpolation typically comprises averaging at least two pixel data among a plurality of left pixel data in first left frame LF1 and averaging at least two pixel data among a plurality of right pixel data in first right frame RF1 in order to maintain high display quality.

After performing interpolation, first merger 21 outputs first and second mixed frames MF1 and MF2 comprising pixel data (e.g., $(L_R+L_G)/2$) resulting from averaging at least two pixel data among the plurality of left pixel data, and pixel data (e.g., $(R_R+R_G)/2$) resulting from averaging at least two pixel data among the plurality of right pixel data.

Third control register 29 may also be used to perform the interpolation. For instance, where a bit value of the third control register 29 is set to "1", interpolation may be performed. Where the 3D display format is the line barrier format, 3D formatter 20 may further comprise a line counter 33 which counts lines in first left and right frames LF1 and RF1.

First merger 21 selects lines from first left and right frames LF1 and RF1 according to counter values counted by line counter 33 and mixes the selected lines with one another to produce first mixed frame MF1 and the second mixed frame MF2.

Fourth control register 31 is used to support the line barrier format. For instance, where a bit value of the fourth control register 31 is set to "1", first merger 21 outputs first and second mixed frames MF1 and MF2 supporting the line barrier format.

First alpha blender 35 outputs a first blended frame BF1 by blending the first and second mixed frames MF1 and MF2 using the following equation (1).

$$C=A\alpha+B(1-\alpha) \quad (1)$$

In equation (1), "C" represents first blended frame BF1, "A" represents first mixed frame MF1, "B" represents second mixed frame MF2, and "α" is an alpha value of first alpha blender 35. The alpha value of first alpha blender 35 is typically "0" or "1". Accordingly, first blended frame BF1 is either first mixed frame MF1 or the second mixed frame MF2. Display controller 10 provides first blended frame BF1 to 3D display 130.

3D formatter 20 further comprises a second merger 41, a control register block 43, a line counter 53, and a plurality of alpha blenders 55 and 57. Second merger 41 mixes a second left frame LF2 comprising a plurality of left pixel data and a second right frame RF2 comprising a plurality of right pixel data and outputs a third mixed frame MF3 and a fourth mixed frame MF4.

Each of third and fourth mixed frames MF3 and MF4 has a format illustrated in FIG. 3, 4, or 5. Second alpha blender 55 blends third mixed frame MF3 and first blended frame BF1 and outputs a second blended frame BF2. An alpha value of second alpha blender 55 is between "0" and "1". Third alpha blender 57 blends fourth mixed frame MF4 and the second blended frame BF2 and outputs a third blended frame BF3. Display controller 10 provides third blended frame BF3 to 3D display 130. An alpha value of third alpha blender 57 is between "0" and "1".

Frames LF2 and RF2, input valid signals ILV2 and IRV2, mixed frames MF3 and MF4, and output valid signals OV3 and OV4 are similar to the frames LF1 and RF1, input valid signals ILV1 and IRV1, mixed frames MF1 and MF2, and output valid signals OV1 and OV2. Accordingly, further description of these features will be omitted in order to avoid redundancy.

The operations and functions of control registers 45, 47, 49, and 51 in the control register block 43 and a line counter 53 are similar to those of control registers 24, 27, 29, and 31 in the control register block 23 and line counter 33. Accordingly, further description of these features will be omitted in order to avoid redundancy.

3D formatter 20 further comprises a fourth alpha blender 59. Fourth alpha blender 59 blends third blended frame BF3 and a third frame F3 and outputs a fourth blended frame BF4. Third frame F3 is a two-dimensional (2D) video or image output from the part of memory 110.

Display controller 10 provides fourth blended frame BF4 to 3D display 130. An alpha value of fourth alpha blender 59 is between "0" and "1".

For clarity of the description, two mergers 21 and 41 and four alpha blenders 35, 55, 57, and 59 are illustrated in FIG. 7. However, the numbers of mergers and alpha blenders may change in other embodiments.

Figure 8:
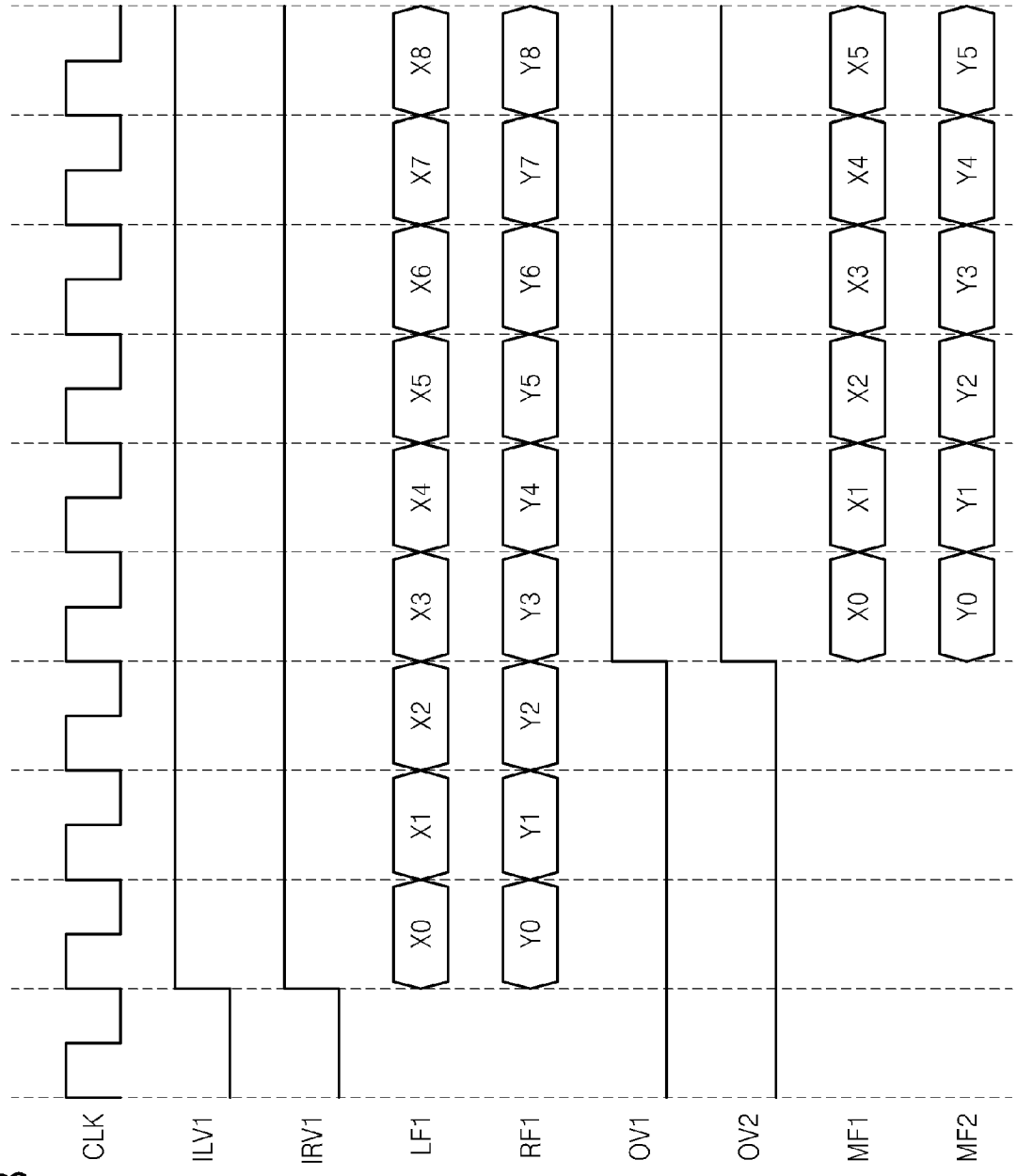
FIG. 8 is a timing chart showing the operation of a merger illustrated in FIG. 7 according to an embodiment of the inventive concept.

FIG. 8 is a timing chart showing the operation of merger 21 illustrated in FIG. 7 according to an embodiment of the inventive concept.

Referring to FIG. 8, it is assumed that the bit values of the first and second control registers 25 and 27 are "1" and bit values of third and fourth control registers 29 and 31 are "0". A clock signal CLK is generated by the PLL.

Where first input valid signal ILV1 is high, first merger 21 receives first left frame LF1 from the part of memory 110 that corresponds to a frame buffer. Here, signals labeled X0 through X8 represent left pixel data (e.g., $L_R$, $L_G$, or $L_B$) or left pixel color comprising a plurality of left pixel data (e.g., $L_R$, $L_G$, and $L_B$). Similarly, where second input valid signal IRV1 is high, first merger 21 receives first right frame RF1 from the part of memory 110. Here, signals labeled Y0 through Y8 represent right pixel data (e.g., $R_R$, $R_G$, or $R_B$) or right pixel color comprising a plurality of right pixel data (e.g., $R_R$, $R_G$, and $R_B$).

Where first output valid signal OV1 is high, first merger 21 performs the mixing operation and outputs first mixed frame MF1. First mixed frame MF1 typically comprises left pixel data (e.g., $L_R$, $L_G$, or $L_B$) and right pixel data (e.g., $R_R$, $R_G$, or $R_B$) or left pixel color and right pixel color. Where first mixed frame MF1 comprises the left pixel color and the right pixel color, first mixed frame MF1 typically has the pixel barrier format illustrated in FIG. 3. On the other hand, where first mixed frame MF1 comprises left pixel data (e.g., $L_R$, $L_G$, or $L_B$) and right pixel data (e.g., $R_R$, $R_G$, or $R_B$), first mixed frame MF1 has the sub-pixel barrier format illustrated in FIG. 4. Where second output valid signal OV2 is high, first merger 21 performs the mix operation and outputs second mixed frame MF2.

First mixed frame MF1 and second mixed frame MF2 are complementary to each other. For example, where first mixed frame MF1 comprises X0, Y1, X2, Y3, X4 and Y5 in order, second mixed frame MF2 may comprise Y0, X1, Y2, X3, Y4 and X5 in order.

Figure 9:
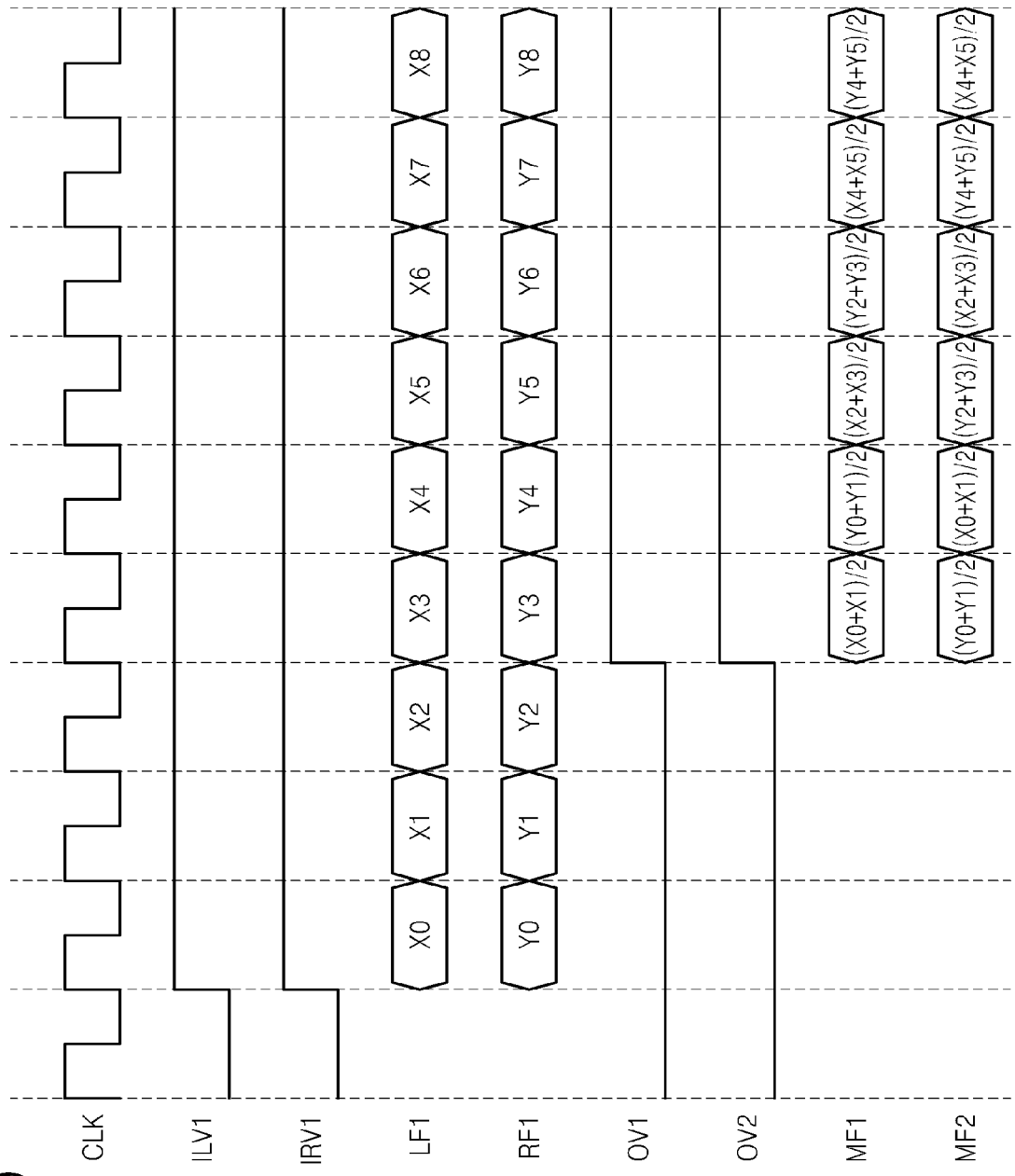
FIG. 9 is a timing chart showing the operation of the merger illustrated in FIG. 7 according to an embodiment of the inventive concept.

FIG. 9 is a timing chart showing the operation of merger 21 illustrated in FIG. 7 according to an embodiment of the inventive concept.

Referring to FIG. 9, it is assumed that the bit values of the first through third control registers 25, 27, and 29 are "1" and the bit value of the fourth control register 31 is "0".

Clock signal CLK, input valid signals ILV1 and IRV1, frames LF1 and RF1 and the output valid signals OV1 and OV2 illustrated in FIG. 9 are similar to those illustrated in FIG. 8. Accordingly, further description of these features will be omitted in order to avoid redundancy.

Here, signals labeled X0 through X8 represent left pixel data (e.g., $L_R$, $L_G$, or $L_B$) or left pixel color comprising a plurality of left pixel data (e.g., $L_R$, $L_G$, and $L_B$). Signals labeled Y0 through Y8 represent right pixel data (e.g., $R_R$, $R_G$, or $R_B$) or right pixel color comprising a plurality of right pixel data (e.g., $R_R$, $R_G$, and $R_B$).

Because the bit value of third control register 29 used to perform the interpolation is set to "1", each of first and second mixed frames MF1 and MF2 comprises average pixel data or average pixel color. Here, (X0+X1)/2 through (Y4+Y5)/2 each indicates average pixel data or average pixel color.

FIG. 10 is a flowchart illustrating a method for operating display controller 10 illustrated in FIG. 1 according to an embodiment of the inventive concept.

Referring to FIG. 10, display controller 10 receives first left frame LF1 and first right frame RF1 (S10).

Display controller 10 mixes first left frame LF1 and first right frame RF1 according to the 3D display format and outputs first mixed frame MF1 and second mixed frame MF2 (S20). Display controller 10 blends first mixed frame MF1 and second mixed frame MF2 using alpha blender 35 and outputs first blended frame BF1 (S30).

As indicated by the foregoing, in various embodiments of the inventive concept, stereoscopic perception of 3D depth is provided to a viewer according to the format of pixel data displayed on a 3D display by using a merger. This can potentially eliminate a need for an extra chip.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A display controller, comprising:
   a processor configured to perform
   a first merger to selectively mix a first left frame comprising first left pixel data and a first right frame comprising first right pixel data based on pixel barrier, sub-pixel barrier and line barrier three-dimensional (3D) display formats, and further to output a first mixed frame and a second mixed frame; and
   a first alpha blending to blend the first mixed frame and the second mixed frame to produce a first blended frame,
   wherein the processor is configured to selectively mix the first left frame and the first right frame in the 3D display formats responsive to a bit value set in a control register.

2. The display controller of claim 1, the processor further configured to count lines in the first left frame and the first right frame when the 3D display format is the line barrier format,
   wherein the first merger selects a line in the first left frame and a line in the first right frame according to values of the counted lines and mixes the selected lines to output the first mixed frame and the second mixed frame,
   wherein the first mixed frame comprises the first left pixel data in an odd-numbered line and the first right pixel data in an even-numbered line, and
   wherein the second mixed frame comprises the first right pixel data in an odd-numbered line and the first left pixel data in an even-numbered line.

3. The display controller of claim 1, wherein the first alpha blending has an alpha value of 0 or 1.

4. The display controller of claim 1, wherein each of the first and second mixed frames comprises some of the first left pixel data and some of the first right pixel data.

5. The display controller of claim 1, wherein each of the first and second mixed frames comprises pixel data resulting from averaging at least two units of pixel data among the first left pixel data and pixel data resulting from averaging at least two pixel data among the first right pixel data.

6. The display controller of claim 1, the processor further configured to perform:
a second merger to selectively mix a second left frame comprising multiple units of second left pixel data and a second right frame comprising multiple units of second right pixel data according to the 3D display format and to output a third mixed frame and a fourth mixed frame; and
a second alpha blending to blend the first blended frame and the third mixed frame and to output a second blended frame.

7. The display controller of claim 6, wherein the second alpha blending has an alpha value between 0 and 1.

8. A method of operating a display controller, comprising:
receiving a first left frame comprising multiple units of first left pixel data;
receiving a first right frame comprising multiple units of first right pixel data; and
generating a first mixed frame and a second mixed frame by selectively mixing the first left frame and the first right frame according to pixel barrier, sub-pixel barrier and line barrier three-dimensional (3D) display formats,
wherein said generating is performed using a processor,
wherein said generating comprises selectively mixing the first left frame and the first right frame in the 3D display formats responsive to a bit value set in a control register.

9. The method of claim 8, further comprising generating a first blended frame comprising blending the first mixed frame and the second mixed frame using a first alpha blender.

10. The method of claim 9, wherein the first alpha blender has an alpha value of 0 or 1.

11. The method of claim 9, further comprising:
selectively mixing a second left frame comprising multiple units of second left pixel data and a second right frame comprising multiple units of second right pixel data according to the 3D display format to produce a third mixed frame and a fourth mixed frame; and
generating a second blended frame by blending the first blended frame and the third mixed frame.

12. A method of operating a display controller, comprising:
operating a merger to selectively mix a first left frame comprising first left pixel data and a first right frame comprising first right pixel data based on pixel barrier, sub-pixel barrier and line barrier three-dimensional (3D) display formats to produce a first mixed frame and a second mixed frame; and
operating an alpha blender to blend the first mixed frame and the second mixed frame to produce a first blended frame,
wherein said operating a merger is performed using a processor, and
wherein said operating a merger comprises selectively mixing the first left frame and the first right frame in the 3D display formats responsive to a bit value set in a control register.

13. The method of claim 12, further comprising:
operating a line counter to count lines in the first left frame and the first right frame when the 3D display format is the line barrier format; and
operating the first merger to select a line in the first left frame and a line in the first right frame according to counter values counted by the line counter and to mix the selected lines to output the first mixed frame and the second mixed frame,
wherein the first mixed frame comprises the first left pixel data in an odd-numbered line and the first right pixel data in an even-numbered line, and the second mixed frame comprises the first right pixel data in an odd-numbered line and the first left pixel data in an even-numbered line.

14. The method of claim 12, wherein each of the first and second mixed frames comprises some of the first left pixel data and some of the first right pixel data.

15. The method of claim 12, further comprising:
operating a second merger to selectively mix a second left frame comprising multiple units of second left pixel data and a second right frame comprising multiple units of second right pixel data according to the 3D display format and to output a third mixed frame and a fourth mixed frame; and
operating a second alpha blender to blend the first blended frame and the third mixed frame and to output a second blended frame.

* * * * *